No. 780,183. PATENTED JAN. 17, 1905.
H. HORN.
BRICK, PEAT, OR LIKE PRESS.
APPLICATION FILED JUNE 24, 1904.

2 SHEETS—SHEET 1.

Witnesses
George G. Schoenbeck
Thomas Kirkpatrick

Inventor
Heinrich Horn
by H. van Oldenneel
Attorney

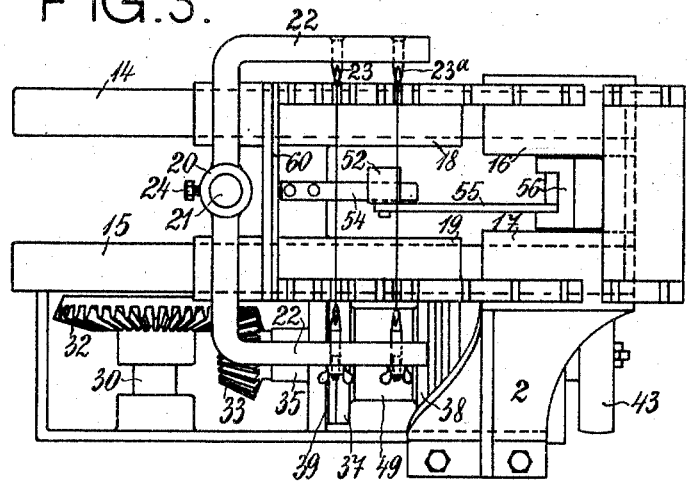
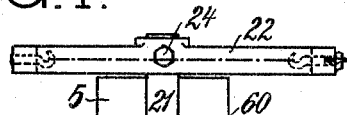
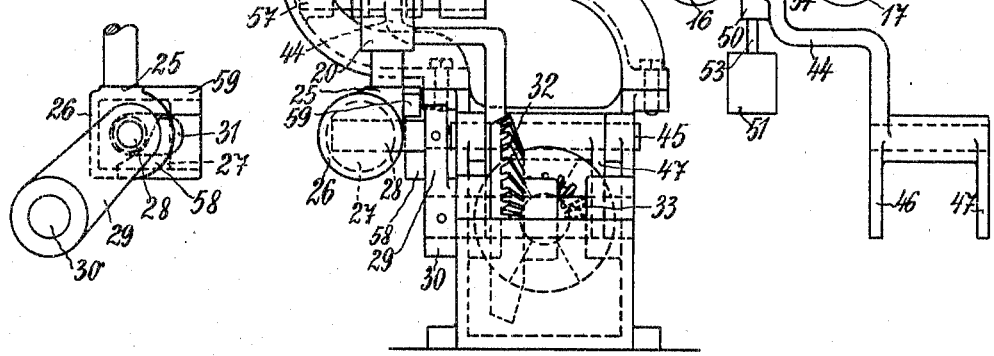

No. 780,183.

Patented January 17, 1905.

UNITED STATES PATENT OFFICE.

HEINRICH HORN, OF GERA-UNTERMHAUS, GERMANY.

BRICK, PEAT, OR LIKE PRESS.

SPECIFICATION forming part of Letters Patent No. 780,183, dated January 17, 1905.

Application filed June 24, 1904. Serial No. 214,028.

*To all whom it may concern:*

Be it known that I, HEINRICH HORN, a subject of the Emperor of Germany, residing at Gera-Untermhaus, in the Principality of Reuss and Empire of Germany, have invented new and useful Improvements in and Relating to Brick, Peat, or Like Presses, of which the following is a specification.

My invention relates to improvements in cutting apparatus for brick, peat, and like presses which is thrown into gear by the slab of compressed material continuously delivered from the press and is automatically stopped after each cut. From the well-known cutting apparatus of the same class the improved apparatus differs advantageously by the fact that it has no sensitive parts liable to get out of order and that no troublesome jerks occur during the operation, there being inserted between the parts of the device for actuating the cutting-wires a yielding connection adapted to receive the blows at the commencement of the operative movements.

In the accompanying drawings I have represented a constructional form of this invention.

Figure 1:
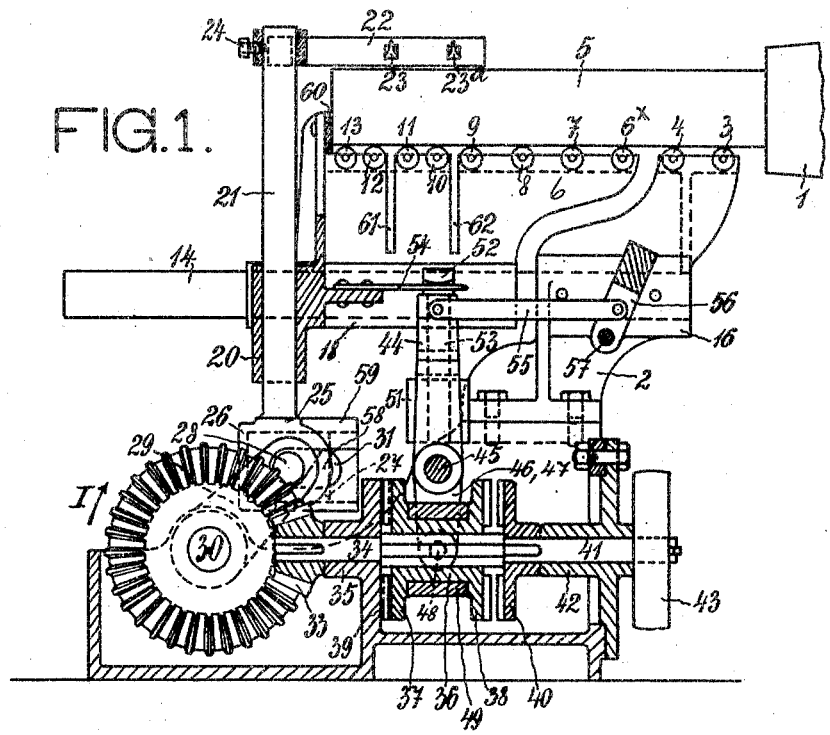
Figure 2:
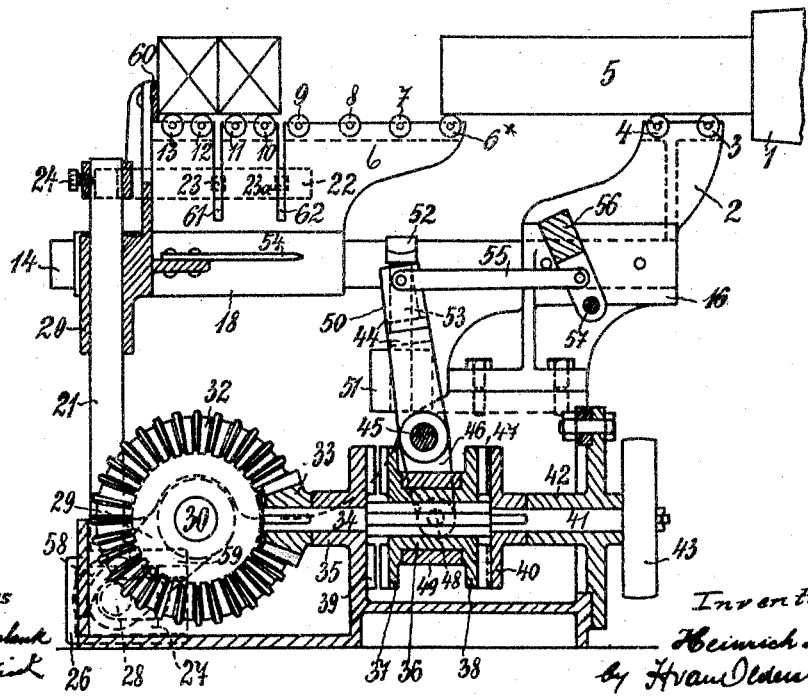

Figures 1 and 2 are side elevations showing the apparatus in different positions. Fig. 3 is a plan of the apparatus. Fig. 4 is a front elevation of the same. Fig. 5 shows the yielding connection between the parts of the device designed for actuating the cutting-wires. Fig. 6 is a detail view of the operating-lever and the adjacent parts.

The automatic cutting apparatus is arranged in front of the die or mouthpiece 1 of the press and comprises a frame 2, in the sides of which are held the guide-rolls 3 4 for the slab 5, continuously delivered from the mouthpiece. The frame 2 has a guide for a slide 6, which is likewise furnished with guide-rolls $6^x$, 7, 8, 9, 10, 11, 12, and 13, on which the slab runs in its further forward movement. In the example illustrated the guide is formed of two cylindrical rods 14 15, secured by one of their ends in bosses 16 17 at the upper part of the frame 2. The slide 6 has semicylindrical guide-blocks 18 and 19, within which it slides upon the rods 14 15. The said slide 6 has, moreover, a vertical boss 20, serving as a guide for the rod 21, carrying the bow-shaped holder 22 of the cutting-wires 23 $23^a$. The holder 22 is, for instance, secured by a set-screw 24 to the upper end of the carrying-rod 21. At the lower end of the carrying-rod 21 is provided a cylindrical casing 25, whose axis extends at right angles to the axis of the carrying-rod, the said casing being open at one end and closed at the other end by a cover 26. Movably arranged in this casing is a cylindrical block 27, with which engages the pin 28 of a crank 29 on a shaft 30, held at the lower part of the frame 2, the said pin 28 passing through the cylindrical casing 25 in a slot 31, running parallel to the axis of the casing.

Upon the shaft 30 is arranged a bevel-wheel 32, gearing with a second bevel-wheel 33 upon a shaft 34, placed at right angles to the shaft 30. The shaft 34, held in a bearing 35, carries a clutch-sleeve 36, adapted to be moved in the axial direction, but prevented from turning, and provided with two clutch halves or members 37 38. One of these clutch members, 37, corresponds to a clutch member 39, fixed to the frame 2 and arranged concentrically to the bearing 35, while the other clutch member, 38, corresponds to a clutch member 40, provided upon a shaft 41, held in a bearing 42 on the frame 2 in the same axis as the shaft 34 and carrying a belt-pulley 43. The shaft 41 is used for driving the automatic cutting apparatus and receives a continuous uniform turning movement through the agency of a belt by the belt-pulley 43. This turning movement of the shaft 41 is transmitted to the shaft 34 as soon as after the disengagement of the clutch members 37 39 the members 38 40 have been coupled together.

The clutch-sleeve 36 is operated by a lever 44, adapted to turn upon a bolt 45, fixed to the frame 2 and which by its downwardly-extending arms 46 47 takes hold of pins 48 on a ring 49, fitted to turn upon the clutch-sleeve 36. At the upper end of the lever 44 is a vertical guide 50 for a rod 53, carrying a weight 51 at the lower end and a hook 52 at the upper end, taking over the upper end of the operating-lever 44. To the slide 6 is secured a tongue 54, arranged in such a manner that in the movement of the said slide in the opposite direction to the operating-lever 44 it takes between the hook-shaped end 52 of the weighted rod 53 over the upper end of the said operating-lever. Rods 55 serve to connect the operating-lever 44 with a weighted tilting lever 56, adapted to turn upon a fixed bolt 57 on the frame 2. As soon as the cylindrical block 27 is forced by the crank 29 against the end or cover 26 of the cylindrical casing 25 a connection adapted for the transmission of positive motion is established between the crank-pin and the rod 21. If, however, in the continued turning movement of the crank 29 the cylindrical block 27 is forced away from the end or cover 26 of the cylindrical casing 24 on the rod 21, the said positive connection between the crank-pin 28 and the rod 21 ceases. In order to establish also a positive connection between the crank-pin and the carrying-rod 21 for this continued movement of the crank, so as to obtain a positive backward movement of the slide 6 and of the cutting-wires 23 23ª, the crank 29 is furnished with a segment forming a tappet 58, which is adapted to engage with a corresponding segment 59 on the cylindrical casing.

The slide 6 carries a stop-bar 60 for the slab 5, passing continuously from the mouth-piece 1 of the press, and has in its sides vertical slots 61 62 for the entrance of the downwardly-moved cutting-wires 23 23ª.

At the commencement of the operation of the cutting apparatus the slide 6 occupies the position shown in Fig. 1, and also the other parts of the apparatus occupy the positions represented in this figure—that is to say, the member 37 of the clutch-sleeve 36 engages with the fixed clutch member 39 and the shaft 34 stops. As soon as the slab 5 in its continued forward movement has reached the stop-bar 60 on the slide it carries away this slide. By this initial displacement of the slide 6 upon its guide-rods 14 15 the tongue 54 on the slide 6 causes lever 44 to rock on its pivot from the position shown in Fig. 1 to that shown in Fig. 2 by reason of the fact that said tongue 54 is held clamped to the lever 44 by means of the hook 52 of the weighted rod 53 and the upper end of the operating-lever 44. In the movement of the operating-lever 44 to this position the tilting lever 56, connected with the same, assists as soon as it has passed beyond its vertical position. By the described movement of the operating-lever 44 the clutch-sleeve 34 is thrown out of gear with the fixed clutch member 39 and the clutch member 38 is thrown into gear with the clutch member 40 on the shaft 41. In this manner the turning movement of the shaft 41 is transmitted by the bevel-wheels 33 32 in the direction of the arrow I, Fig. 1, to the shaft 34, and thus to the crank 29. This crank 29 pulls the carrying-rod 21 downward, together with the bow-shaped holder 22 of the cutting-wires 23 23ª. By this means the cylindrical block 27 is moved by the crank-pin to the open end of the cylindrical casing 25, no displacement of the slide 6 taking place during this downward movement of the cutting-wires 23 23ª through the slab because the cylindrical block 27, which is engaged by the crank-pin 28 and moves in the cylindrical casing 25, is pushed to the open side of the casing 25 and back again, whereby the slot 31 in the casing is left free or released by the cylindrical block 27, so that the air can pass in and out freely and forms no obstruction for the relative movement of the block 27 to the casing 25. Only after the rear end of the cylindrical block 27 in the continued turning movement of the crank 29 in the direction of the arrow I, Fig. 1, has reached the end of the slot 31 in the wall of the cylindrical casing 25 the air between the cylindrical block 27 and the end or cover 26 of the cylindrical casing 25 is compressed and forms an elastic cushion for initiating the movement of the slide 6 by the crank 29. Thus the air-cushion between the end or cover 26 and the cylindrical block 27 forms a yielding connection at the beginning of the displacement of the slide 6 by the crank 29. As soon as the crank in its turning movement traverses the upper part of its path the slide 6 and rod 21 are moved back to their original position, Fig. 1. For this purpose the portion 58 on the crank 29 engages with the portion 59 on the cylindrical casing 25, and the two parts remain so engaged until the carrying-rod 21 for the bow-shaped holder 22 of the cutting-wires and the slide 6 reach their initial positions. On the passage to these positions the tongue 54 on the slide 6 has again moved between the hook-shaped end 52 of the weighted rod 53 and the upper end of the operating-lever 44 and has moved this lever to the position shown in Fig. 1, the tilting lever 56 connected with it being tilted at the same time, thereby initiating the movement required for changing the clutch-sleeve by the said lever 44. By this means the disengagement of the clutch members 38 and 40, and consequently of the shafts 34 and 41, takes place, while by throwing the clutch members 37 39 into gear the stoppage of the shaft 34, and thus of the mechanism actuated by the same, takes place. The apparatus is then ready for the next operation.

What I claim as my invention, and desire to secure by Letters Patent, is—

1. In apparatus of the character described, a frame, rolls carried by the same for guiding the compressed slab to be cut, a holder of the cutting-wires, rolls for guiding the slab, a slide carrying these rolls and the said holder, a horizontal guide for the slide on the frame, a crank for imparting to-and-fro movement to the said slide, means for establishing a yielding and positive connection between the said slide and crank, and means for imparting intermittent turning movement to the said crank, substantially as herein set forth.

2. In apparatus of the character described, a frame, rolls carried by the same for guiding the compressed slab to be cut, a holder of the cutting-wires, rolls for guiding the slab, a slide carrying these rolls and the said holder, two cylindrical horizontal parallel guide-bars for the slide, these bars being fixed at one end in the said frame, hollow cylindrical guide-blocks provided on the aforesaid slide and adapted to be displaced on the guide-bars, a crank for imparting to-and-fro movement to the said slide, means for establishing a yielding and positive connection between the said slide and crank, and means for imparting intermittent turning movement to the said crank, substantially as herein set forth.

3. In apparatus of the character described, a frame, rolls carried by the same for guiding the compressed slab to be cut, a holder of the cutting-wires, rolls for guiding the slab, a slide carrying these rolls and the said holder, a horizontal guide for the slide on the frame, a crank for imparting to-and-fro movement to the aforesaid slide, a shaft carrying this crank, a shaft for driving the crank-shaft, means for transmitting the turning movement of the former shaft to the latter, an axially-movable clutch-sleeve upon the driving-shaft, two clutch members on the clutch-sleeve, a clutch member fixed to the frame and corresponding to one of the clutch members on the sleeve, and a clutch member arranged upon a shaft placed in the same axis as the driving-shaft and adapted to turn continuously, this member corresponding to the other clutch member on the clutch-sleeve, means for displacing the latter upon its shaft, means for establishing a yielding and positive connection between the said slide and crank, and means for imparting intermittent turning movement to the said crank, substantially as herein set forth.

4. In apparatus of the character described, a frame, rolls carried by the same for guiding the compressed slab to be cut, a holder of the cutting-wires, rolls for guiding the slab, a slide carrying these rolls and the said holder, a horizontal guide for the slide on the frame, a crank for imparting to-and-fro movement to the aforesaid slide, a shaft carrying this crank, a shaft for driving the crank-shaft, means for transmitting the turning movement of the former shaft to the latter, an axially-movable clutch-sleeve upon the driving-shaft, two clutch members on the clutch-sleeve, a clutch member fixed to the frame and corresponding to one of the clutch members on the sleeve, and a clutch member arranged upon a shaft placed in the same axis as the driving-shaft and adapted to turn continuously, this member corresponding to the other clutch member on the clutch-sleeve, an operating-lever adapted to take hold of the clutch-sleeve and to be turned in the vertical plane, an upwardly-extending arm on the operating-lever, a vertical guide at the upper end of this arm, a weighted rod adapted to slide in this guide, a hook-shaped projection provided on the said weighted rod and taking over the upper end of the said arm, a tongue arranged on the said slide and adapted to pass between the upper end of the arm and the hook-shaped end of the weighted rod, and a stop-bar on the slide for the compressed slab, substantially as herein set forth.

5. In apparatus of the character described, a frame, rolls carried by the same for guiding the compressed slab to be cut, a holder of the cutting-wires, rolls for guiding the slab, a slide carrying these rolls and the said holder, a horizontal guide for the slide on the frame, a crank for imparting to-and-fro movement to the said slide, a rod carrying the said holder at its upper end, a vertical guide furnished on the aforesaid slide for the carrying-rod, means for establishing a yielding and positive connection between the lower end of the carrying-rod and crank, and means for imparting intermittent turning movement to the said crank, substantially as herein set forth.

6. In apparatus of the character described, a frame, rolls carried by the same for guiding the compressed slab to be cut, a holder of the cutting-wires, rolls for guiding the slab, a slide carrying these rolls and the said holder, a horizontal guide for the slide on the frame, a crank for imparting to-and-fro movement to the aforesaid slide, a rod carrying the said holder at its upper end, a vertical guide furnished on the aforesaid slide for the said carrying-rod, a cylindrical casing open at one end and provided at the lower extremity of the said carrying-rod, a cylindrical block adapted to slide in the casing, a slot in the side of the casing, a pin on the aforesaid crank extending through this slot and adapted to take hold of the said block in the casing, means for establishing a positive connection between the lower end of the said carrying-rod and crank, and means for imparting intermittent movement to the said crank, substantially as herein set forth.

7. In apparatus of the character described, a frame, rolls carried by the same for guiding the compressed slab to be cut, a holder of the cutting-wires, rolls for guiding the slab, a slide carrying these rolls and the said holder, a horizontal guide for the slide on the frame, a crank for imparting to-and-fro movement to the said slide, a rod carrying the said holder at its upper end, a vertical guide furnished on the aforesaid slide for the carrying-rod, a cylindrical casing open at one end and provided at the lower extremity of the said carrying-rod, a cylindrical block adapted to slide in the casing, a slot in the side of the casing, a pin on the aforesaid crank extending through this slot and adapted to take hold of the said block in the casing, a convex segment on the crank, and a corresponding concave segment on the cylindrical casing, these segments being adapted to engage with each other in the back movement of the aforesaid slide, and means for imparting intermittent movement of the said crank, substantially as herein set forth.

In testimony whereof I have signed my name to this specification in the presence of two subscribing witnesses.

HEINRICH HORN.

Witnesses:
 OSCAR KOCH,
 SOUTHARD P. WARNER.